United States Patent [19]
Willis

[11] Patent Number: 4,524,411
[45] Date of Patent: Jun. 18, 1985

[54] REGULATED POWER SUPPLY CIRCUIT

[75] Inventor: Donald H. Willis, Indianapolis, Ind.

[73] Assignee: RCA Corporation, Princeton, N.J.

[21] Appl. No.: 426,360

[22] Filed: Sep. 29, 1982

[51] Int. Cl.³ .......................................... H02M 3/335
[52] U.S. Cl. ..................................... 363/21; 358/190; 331/112
[58] Field of Search ....................... 363/18, 19, 20, 21, 363/27, 97, 98; 331/111, 112, 146; 336/184; 358/190; 315/411

[56] References Cited
U.S. PATENT DOCUMENTS

| | | |
|---|---|---|
| 3,838,332 | 9/1974 | Hopengarten . |
| 3,889,173 | 6/1975 | Klusmann et al. ................... 331/112 |
| 4,176,304 | 9/1979 | Scott ..................................... 315/411 |
| 4,318,039 | 3/1982 | Abbott ................................. 323/273 |

FOREIGN PATENT DOCUMENTS 1004594 9/1965 United Kingdom ................ 336/184
2002984 2/1979 United Kingdom .

Primary Examiner—Peter S. Wong
Assistant Examiner—Anita M. Ault
Attorney, Agent, or Firm—Paul J. Rasmussen; Peter M. Emanuel; Scott J. Stevens

[57] ABSTRACT

A regulated switched-mode power supply for a television receiver utilizes a high voltage power transformer. A transformer primary winding, energized in response to a pulse width modulated signal, energizes electrically isolated load circuit windings via transformer action to transfer energy from an unregulated voltage source. A supplemental transformer winding, magnetically coupled to the primary winding, transfers additional energy to the load circuits to maintain accurate load circuit voltage regulation under all receiver operating conditions.

9 Claims, 6 Drawing Figures

REGULATED POWER SUPPLY CIRCUIT

This invention relates to power supplies for television receivers and in particular to regulated power supplies utilizing a transformer.

Many color television circuits require carefully regulated power supplies in order to operate in a satisfactory manner. For example, if the deflection circuit supply levels are not controlled, the size of the scanned raster will undesirably change in response to ac line variations and power supply loading by other receiver circuits.

One regulating circuit arrangement utilizes a silicon controlled rectifier which is connected to a source of unregulated voltage developed from the ac line. Conduction of the SCR during each horizontal cycle causes the unregulated voltage to charge a capacitor. The conduction interval of the SCR is controlled to minimize variations of the voltage developed across the capacitor in order to produce a regulated voltage independent of ac line variations and receiver circuit loading.

The increasing need for the television receiver to display material from various program sources, such as video disc and tape players, video games and home computers, and the use of external audio equipment has increased the need for electrically isolating the input and output circuits of the receiver from the ac line to prevent the possibility of a shock to a user touching input or output terminals of the receiver.

Isolating the input and output circuits may be difficult and costly when, for example, the receiver incorporates an SCR regulator such as that previously described. The anode of the SCR is normally coupled directly to the capacitor which develops the source of unregulated voltgage. The SCR is also coupled to the high voltage transformer via a winding which carries a horizontal retrace related pulse used to commutate the SCR off. Electrical isolation between the unregulated supply and the SCR requires the addition of an isolation transformer. To provide electrical isolation at the high voltage transformer between the primary and load windings may result in a reduction in the degree of magentic coupling between the primary and load winding which may cause a reduction in the commutating retrace pulse amplitude applied to the SCR gate, thereby causing a degradation of the regulator operation. Isolation at the imput and output interface points also requires the use of isolation transformers.

The present invention is direction to a regulated power supply arrangement which provides receiver interface circuit isolation via the high voltage transformer without sacrificing regulator operation or increasing receiver costs.

U.K. Patent Application No. 2,002,984 entitled "Improved Television Receiver Line Deflection Output Stage", illustrates a television receiver circuit which regulates load circuit voltage via controlled switched-mode power transfer through a high voltage power transformer. Although it is stated that ac line isolation may be effected, increasingly stringent isolation requirements may require so much insulating material be placed between the primary and load windings that the magnetic coupling coefficient is reduced to a point that sufficient power transfer to effect accurate voltage regulation under certain severe receiver operating conditions is impossible.

In accordance with the invention, a switched-mode regulated power supply for a television receiver having a plurality of load circuits comprises a source of unregulated potential and a first winding of a transfromer. A switching means selectively couples the unregulated potential to the first winding when in a conducting condition and uncouples the unregulated potential from the first winding when in a nonconducting condition. A second transformer winding is magnetically coupled to the first winding and receives energy from it which is supplied to at least one of the load circuits. Means are coupled to the second winding and to the switch for causing the switch to switch between its conducting and nonconducting conditions. A supplemental transformer winding is magnetically coupled to the first winding and supplies energy to at least one of the load circuits.

In the accompanying drawing.

Figure 1:
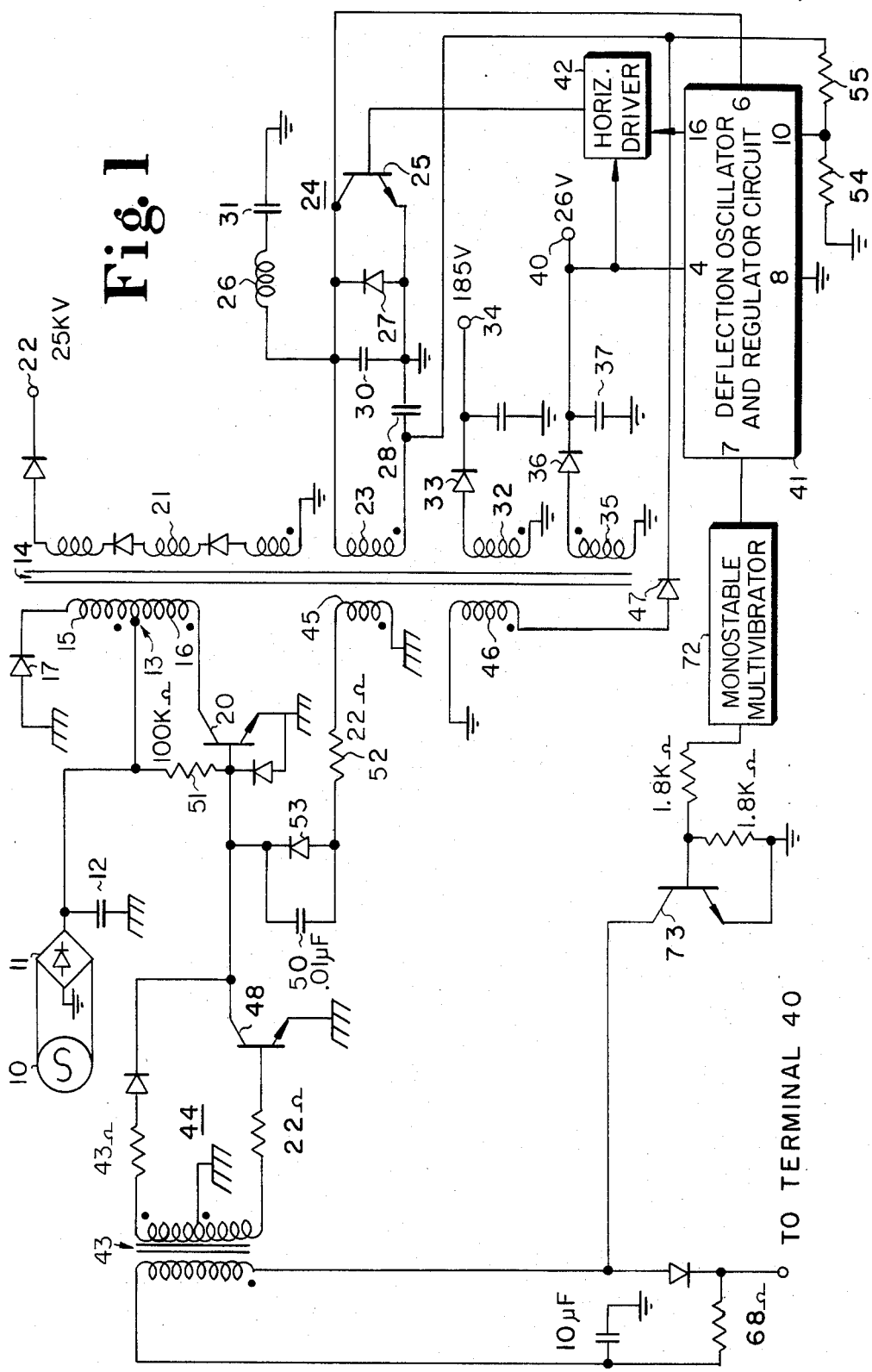
FIG. 1 is a schematic diagram of a portion of a television receiver incorporating a regulated power supply constructed in accordance with the present inventionl.

Referring to FIG. 1, there is shown a regulated power supply circuit for a television receiver that provides isolation from the ac line. In the circuit of FIG. 1, the ac line voltage from an ac line source 10 is applied to a bridge rectifier 11 which produces a source of unregulated voltage across a capacitor 12. This unregulated voltage is applied to the center tap of a primary winding 13 of a power transformer 14. Winding 13 is made up of two symmeterical winding segments 15 and 16 with the end of winding segment 15 coupled to ground through a diode 17 and the end of winding segment 16 coupled to the collector of a transistor 20. Conduction of transistor 20 causes current to flow in primary winding 13 which through transformer action induces current in the other windings of transformer 14. These windings include high voltage windings 21 which provide an ultor potential at an ultor terminal 22 of the order of 25 KV for a kinescope (not shown). Winding 23 as shown develops power for a horizontal deflection circuit 24 which includes a horizontal output transistor 25, a horiztonal deflection winding 26, damper diode 27, deflection bypass capacitor 28, and retrace and S-shaping capacitors 30 and 31, respectively. Winding 32 provides a rectified voltage via diode 33 at a terminal 34 of the order of 185 volts for operating the kinescope driver circuit, for example.

Secondary winding 35 generates a voltage which is rectified by a diode 36 and filtered by a capacitor 37 to provide a direct voltage of the order of the 26 volts at a terminal 40 which is applied to various receiver circuits including deflection oscillator and voltage regulator circuit 41, which may be of conventional design, such as RCA stock No. 153875, and horizontal driver circuit 42. Deflection oscillator and regulator circuit 41 samples the horizontal retrace pulses appearing at the collector of transistor 25. Deflection oscillator and regulator circuit 41 is coupled via a monostable multivibrator 72 and a driver transistor 73 to the primary winding of a transformer 43. The secondary winding of transformer 43 is coupled to a driver circuit 44 including a turnoff transistor 48, which in turn is coupled to the base of transistor 20. A feedback winding 45 of transformer 14 provides current feedback from winding 45 via diode 53 to the base of transistor 20 to help drive transistor 20 and to provide self-oscillation of transistor 20 in the absence of output from transformer 43.

Figure 6:
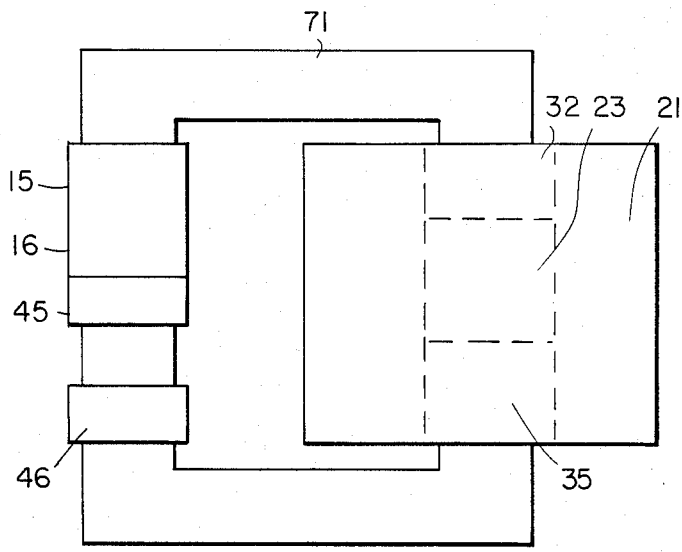
FIG. 6 is a diagrammatic view of a high voltage transformer illustrating the mechanical arrangement of the primary and secondary coils.

A secondary winding 46 of transformer 14 is coupled via a diode 47 to the horizontal deflection circuit 24 and to deflection oscillator and regulator circuit 41 for supplying power to the receiver load circuits in a manner which will be described later. One physical arrangement of the windings of transformer 14 is shown in FIG. 6.

When transistor 20 is switched into conduction, current flows from the unregulated voltage supply developed across capacitor 12 through winding segment 16 of transformer primary winding 13. Through transformer action, current also flows in windings 45 and 46 and in load windings 21, 23, 32 and 35 of transformer 14, generating power to operate their associated load circuits. By controlling the conduction time of transistor 20, the magnitude of the voltages produced across the load circuit secondary windings can be regulated. The means by which this is accomplished will now be described.

When the receiver is initially energized, the unregulated voltage across capacitor 12 causes current to flow through resistor 51 to charge capacitor 50. When capacitor 50 is charged to a voltage at which the base-emitter junction of transistor 20 becomes forward biased, transistor 20 is rendered conductive. Conduction of transistor 20 causes current to flow in winding segment 16, which in turn causes current to flow in winding 45. This provides feedback current to the base of transistor 20 through resistor 52 and diode 53, producing a regenerative action which causes transistor 20 to become more conductive and eventually saturate. Current increases in winding 16 until the base current supplied by winding 45 is insufficient to maintain transistor 20 in saturation. At this point, the collector voltage begins to rise, forcing a regenerative turnoff action of transistor 20. When transistor 20 turns off, the stored energy in winding 16 is transferred to tightly coupled winding 15, causing diode 17 to conduct, returning the stored energy to the unregulated voltage source. Energy is returned until diode 17 is no longer conductive. At this point, the unregulated voltage source again causes current to flow in winding 16, causing a repeat of the previously described start-up cycle.

These start-up cycles transfer sufficient power through windings 23, 32, 35 and 46 to begin normal operation of the receiver.

During normal receiver operation, deflection oscillator and regulator circuit 41 produces voltage regulating pulses which, by way of driver transistor 73 and transformer 43, turn transistor 48 on and off. Monostable multivibrator 72 limits the duty cycle of transistor 20 to approximately 50% so that excessive dc currents are not developed in transistor 20 during start-up or low ac line conditions. Since windings 15 and 16 are symmetrical windings, a duty cycle of greater than 50% for transistor 20 would generate more stored energy in winding 16 when transistor 20 is on than could be transferred to loads or returned to the unregulated supply by winding 15 when transistor 20 turns off, thereby undesirably increasing dc current in transistor 20 and related components. By limiting the duty cycle to 50%, there will never be more energy stored in winding 16 than can be transferred by winding 15 during the conduction of diode 17.

Figure 2:
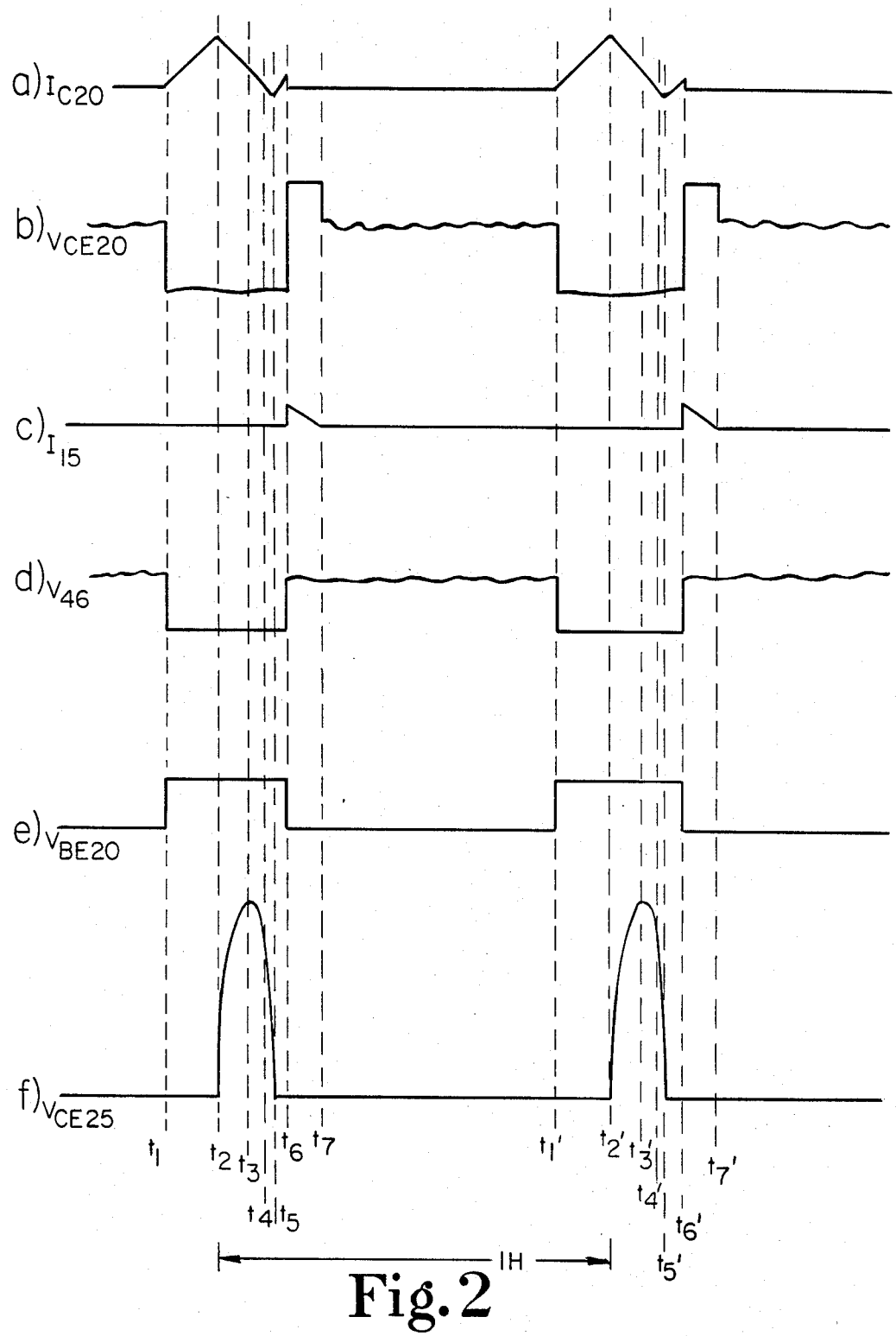
FIG. 2 illustrates waveforms associated with the circuit shown in FIG. 1.

Transformer 43 produces pulses which raise the base-emitter voltage of transistor 20 (shown in FIG. 2e), turning it on. These pulses occur time $t_1$. Once transistor 20 is conductive, current from winding 45 through resistor 52 keeps it on. The collector current of transistor 20 ($I_{C20}$) and hence current in winding 16, increases as shown in FIG. 2a until the beginning of horizontal retrace, at time $t_2$. Because of the coupling polarities of windings 15, 23 and 45, horizontal retrace pulses ($V_{CE25}$), shown in FIG. 2f, applied to winding 23, act to decrease the collector current of transistor 20, since winding 23 is loosely coupled magnetically to windings 15, 16 and 45. At the end of horizontal retrace, at time $t_5$, the collector current of transistor 20 and winding 16 again begins to rise. At time $t_6$, transistor 20 is turned off by reversal of the primary winding voltage in transformer 43. In order to maintain flux continuity in transformer 14, the stored energy in winding 16 causes current to flow in winding 15 ($I_{15}$), as is shown in FIG. 2c, since windings 15 and 16 are magnetically tightly coupled. The stored energy is recovered by being returned to the unregulated supply until time $t_7$ when diode 17 turns off and current flow in winding 25 ceases. The collector-emitter voltage of transistor 20 ($V_{CE20}$) is shown in FIG. 2b. The ringing which occurs while transistor 20 is off is due to stray capacitance between windings 15 and 16 and high voltage ringing induced by winding 21.

As loading on the power supplies is increased or the unregulated voltage level decreases, the regulator circuit of deflection oscillator and regulator 41, which samples the retrace voltage level via voltage divider resistors 54 and 55, produces a pulse to turn on transistor 20 at an earlier point in time. The regulator may be a conventional pulse width modulator which produces pulses which vary their initiation times in response to the sampling voltage. As the conduction time of transistor 20 in increased, for example, the voltages induced across the load windings will also increase. By controlling the conduction time of transistor 20, the load circuit voltage levels can be regulated.

As previously described, it is desirable to isolate the receiver load circuits to provide direct input and output interfaces for external video and audio components. This is shown in FIG. 1 by different ground symbols identifying the "hot" ground components, such as the unregulated voltage supply, and the "cold" chassis ground components, such as the 26V supply. In order to satisfy stringent electrical isolation requirements, the degree of coupling in transformer 14 between windings 15 and 16 and windings 21, 23, 32 and 35 may be required to be reduced as a result of the physical location of the windings and amount of insulating material used. This may prevent sufficient power from being transferred to the load circuits via winding 15 due to a lowered coupling coefficient.

To overcome the above-identified problem, winding 46 is provided to supplement the power transfer to the load circuits. With coupling polarity as shown in FIG. 1, the turnoff of transistor 20 results in a voltage induced across winding 46, as shown in FIG. 2d, which applies a pulse of energy to the load circuits. Winding 16 is more tightly coupled to winding 46 than to winding 21, 23, 32 and 35. In FIG. 1, winding 46 energy is applied to the horizontal deflection circuit, but it may be used to provide power to any of the load circuits of the receiver. The amount of energy transferred to load circuits by winding 46 is provided by the stored energy in transformer 14 created by winding 16 and therefore results in a corresponding decrease in the amount of energy that is returned to the unregulated supply via winding 15. Winding 46 therefore supplements the transfer of energy by winding 16 and compensates for any reduction in energy transfer that may occur as a result of compliance with any electrical isolation requirements.

Figure 3:
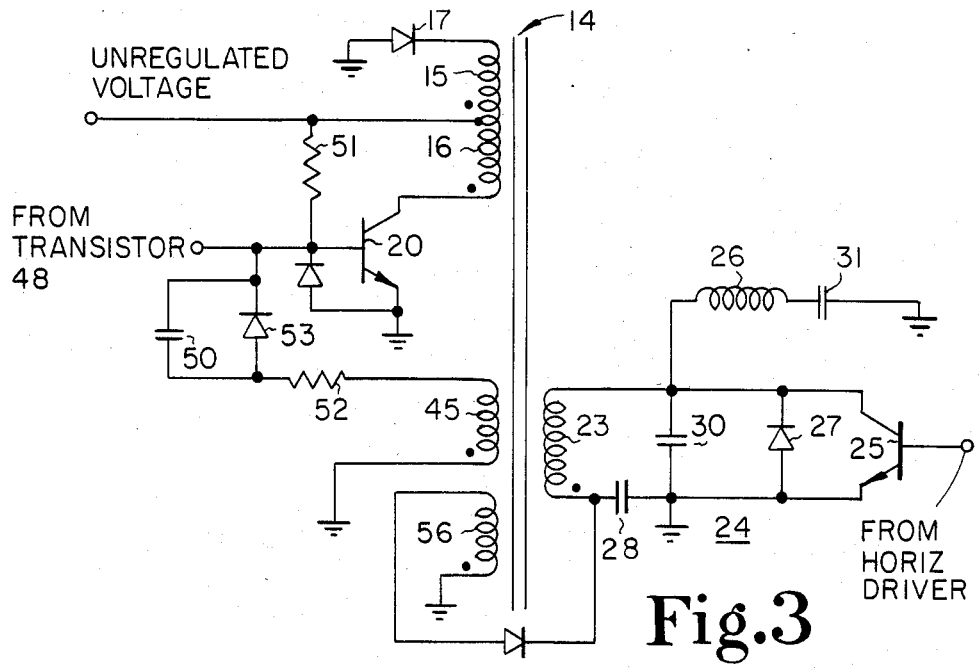
FIG. 3 is a schematic diagram of an alternate embodiment of the high voltage transformer shown in FIG. 1.

FIG. 3 illustrates a circuit arrangement in which the coupling polarity of a supplemental winding 56 is such that energy is transferred during the time that transistor 20 is conductive, rather than nonconductive as previously described with respect to FIG. 1.

Figure 4:
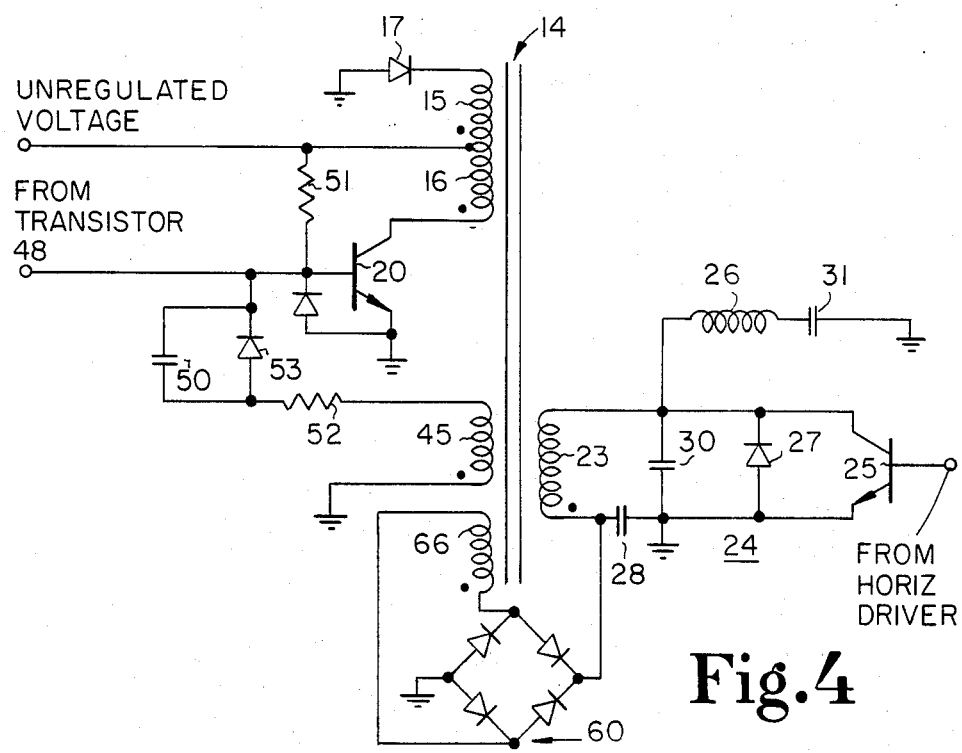
FIG. 4 is a schematic diagram of another alternate embodiment of the high voltage transformer of FIG. 1.

FIG. 4 illustrates a supplemental winding 66 coupled to a full wave rectifier circuit 60 which provides high power transfer capability and avoids high reverse voltage spikes on the rectifier diodes from winding 66.

Figure 5:
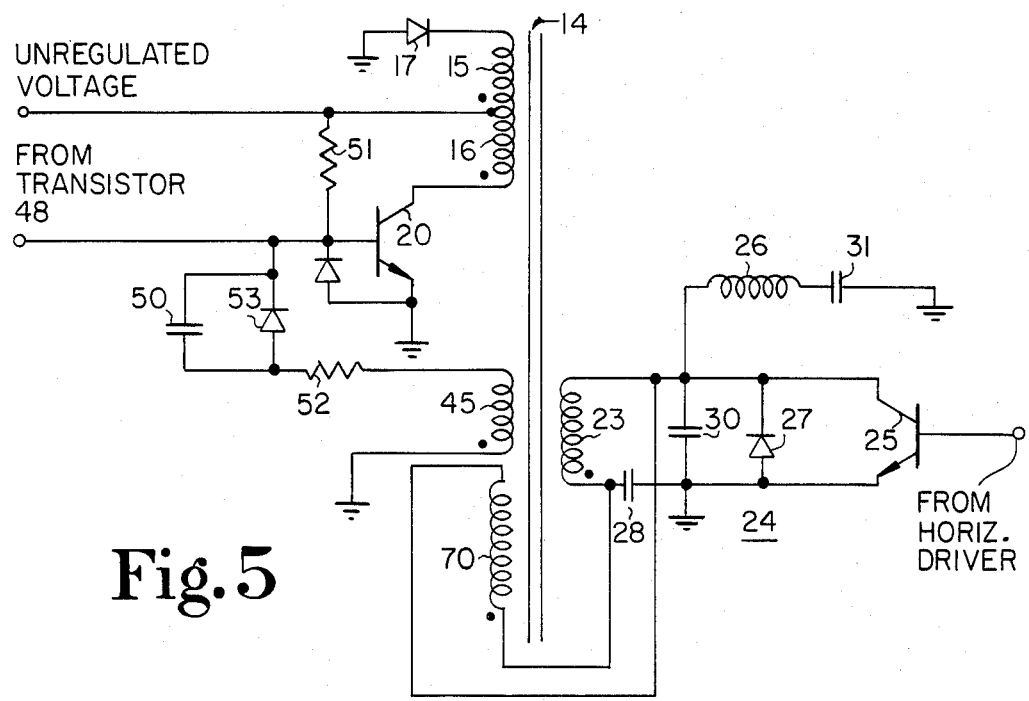
FIG. 5 is a schematic diagram of another embodiment of a regulated power supply in accordance with the present invention.

FIG. 5 illustrates a supplemental winding 70 having both winding terminals coupled to the horizontal deflection circuit. This configuration removes the requirement for a rectifying diode and does not add any additional circuit connection points.

FIG. 6 illustrates one possibility for winding power transformer 14. Windings 15 and 16, which may be bifilar wound, and windings 45 and 46 are wound on one leg of a transformer ferrite core 71, with electrically isolated windings 21, 23, 32 and 35 being wound on the other leg of the core. This results in windings 15 and 16 being relatively tightly coupled magnetically to windings 45 and 46 and relatively loosely coupled to windings 21, 23, 32 and 35. This physical separation allows for the placement of insulating material within the transformer to achieve sufficient electrical isolation. Although winding 46 is also electrically isolated from windings 15, 16 and 45, the voltage difference between them is small enough to provide isolation while being wound on the same core leg. This permits a greater amount of power transfer via winding 46.

What is claimed is:

1. A switched mode regulated power supply for a television receiver having a plurality of load circuits comprising:
   a source of unregulated potential;
   a first transformer winding;
   switching means for selectively coupling said source of unregulated potential to said first transformer winding when in a conducting condition and for uncoupling said source of unregulated potential from said first transformer winding when in a nonconducting condition;
   at least a second transformer winding magnetically coupled to said first winding for receiving energy from said first winding and coupled to said load circuits for energizing at least one of said load circuits, the amount of said energy received by said second winding being limited by the degree of coupling between said first and second windings;
   means coupled to said second transformer winding and to said switching means for causing said switching means to switch between its conducting and nonconducting conditions; and
   a supplemental transformer winding magnetically coupled to said first transformer winding more tightly than the coupling between said first and second transformer windings for receiving energy from said first transformer winding in order to provide additional energy to said at least one of said load circuits to supplement energy received by said one load circuit from said second winding.

2. The arrangement defined in claim 1, wherein said first, second and supplemental transformer windings comprise a high voltage transformer.

3. The arrangement defined in claim 2, wherein said high voltage transformer comprises a core having first and second leg portions, said first winding and said supplemental winding being wound on said first leg portion and said second winding being wound on said second leg portion.

4. The arrangement defined in claim 1, wherein said means causing said switching means to switch comprises a pulse width modulator responsive to the voltage developed across said second transformer winding for controlling the switching of said switching means in order to regulate the voltage level developed across said second transformer winding.

5. The arrangement defined in claim 1 wherein said first transformer winding is electrically isolated from said second transformer winding and from said supplemental transformer winding.

6. The arrangement defined in claim 1, wherein said supplemental transformer winding is coupled to said first winding in a manner such that said supplemental transformer winding is energized when said switching means is in a nonconducting condition.

7. A switched mode regulated power supply for a television receiver having a plurality of load circuits comprising:
   a source of unregulated potential;
   a first transformer winding;
   switching means for selectively coupling said source of unregulated potential to said first transformer winding when in a conducting condition and for uncoupling said source of unregulated potential from said first transformer winding when in a nonconducting condition;
   at least a second transformer winding magnetically coupled to said first winding for receiving energy from said first winding and coupled to said load circuits for energizing at least one of said load circuits;
   means coupled to said second transformer winding and to said switching means for causing said switching means to switch between its conducting and nonconducting conditions; and
   a supplemental transformer winding magnetically coupled to said first transformer winding more tightly than the coupling between said first and second transformer windings for receiving energy from said first transformer windings in order to energize at least one of said load circuits, wherein said supplemental transformer winding is coupled to said first winding in a manner such that said supplemental transformer winding is energized when said switching means is in a conducting condition.

8. A switched mode regulated power supply for a television receiver having a plurality of load circuits comprising:
   a source of unregulated potential;

a first transformer winding;

switching means for selectively coupling said source of unregulated potential to said first transformer winding when in a conducting condition and for uncoupling said source of unregulated potential from said first transformer winding when in a nonconducting condition;

at least a second transformer winding magnetically coupled to said first winding for receiving energy from said first winding and coupled to said load circuits for energizing at least one of said load circuits;

means coupled to said second transformer winding and to said switching means for causing said switching means to switch between its conducting and nonconducting conditions; and a supplemental transformer winding magnetically coupled to said first transformer winding more tightly than the coupling between said first and second transformer windings for receiving energy from said first transformer winding in order to energize at least one of said load circuits, wherein said supplemental transformer winding is coupled to at least one of said load circuits via a bridge rectifier.

9. A switched-mode regulated power supply for a television receiver having a plurality of load circuits comprising:

a source of unregulated potential;

a first transformer winding;

switching means for selectively coupling said source of unregulated potential to said first transformer winding when in a conducting condition and for uncoupling said source of unregulated potential from said first transformer winding when in a nonconducting condition;

a plurality of transformer load windings magnetically coupled to said first winding for developing voltages across said load windings in response to said first winding energization and coupled to respective ones of said load circuits for energizing respective ones of said load circuits, one of said load circuits comprising a deflection circuit producing retrace pulses appearing across said load windings, means coupled to said transformer load windings and to said switching means for causing said switching means to switch between its first and second conduction conditions in order to regulate said voltages developed across said load windings; and a supplemental transformer winding magnetically coupled to said first transformer winding more tightly than the coupling between said first transformer winding and said load windings for receiving energy from said first transformer winding to order to energize at least one of said load circuits.

* * * * *

UNITED STATES PATENT AND TRADEMARK OFFICE
CERTIFICATE OF CORRECTION

PATENT NO. : 4,524,411
DATED : 6/18/85
INVENTOR(S) : DONALD HENRY WILLIS

It is certified that error appears in the above-identified patent and that said Letters Patent is hereby corrected as shown below:

Column 4, line 10, after "occur" and before "time" insert -- at --.

Column 4, line 30, that portion reading "25" should read -- 15 --.

Column 4, line 45, that portion reading "in" should read -- is --.

Column 6, line 58, that portion reading "windings" should read -- winding --

Signed and Sealed this

Twelfth Day of November 1985

[SEAL]

Attest:

DONALD J. QUIGG

Attesting Officer

Commissioner of Patents and Trademarks